United States Patent [19]

Spitzack

[11] 4,134,566
[45] Jan. 16, 1979

[54] MOUNTING BRACKET FOR SUBMERSIBLE PUMP CONTROL BOX

[76] Inventor: Gerald L. Spitzack, R.R. #2, Box 22, Faribault, Minn. 55021

[21] Appl. No.: 815,927

[22] Filed: Jul. 15, 1977

[51] Int. Cl.² .......................................... F16M 13/02
[52] U.S. Cl. ............................................... 248/309 R
[58] Field of Search ............ 248/309 R, 311.1, 231.1, 248/205 R, 441 B, DIG. 6, 451

[56] References Cited

U.S. PATENT DOCUMENTS

| 1,260,136 | 3/1918 | Brewer | 248/205 R |
|---|---|---|---|
| 1,855,751 | 4/1932 | Buchanan | 248/DIG. 6 |
| 1,983,670 | 12/1934 | Knight | 248/DIG. 6 |
| 2,032,636 | 3/1936 | Seckinger | 248/DIG. 6 |
| 2,367,909 | 1/1945 | Wanner | 248/309 R |
| 2,673,057 | 3/1954 | Morris | 248/311.1 |
| 3,868,080 | 2/1975 | Olson | 248/205 R |
| 3,964,612 | 6/1976 | Skilliter | 248/309 R |

FOREIGN PATENT DOCUMENTS

694882  12/1930  France ................... 248/311.1

Primary Examiner—Francis K. Zugel
Attorney, Agent, or Firm—Douglas L. Carlsen

[57] ABSTRACT

A bracket for mounting a control box for a submersible pump on the pump pressure tank comprising an upright support bar having a foot at its lower end adapted to be secured to the top of the tank, a cross bar pivoted to a medial point on the support bar, the cross bar having longitudinally extending slots on either side of the pivot, and the support bar having a longitudinally extending slot above the pivot.

1 Claim, 3 Drawing Figures

U.S. Patent     Jan. 16, 1979     4,134,566
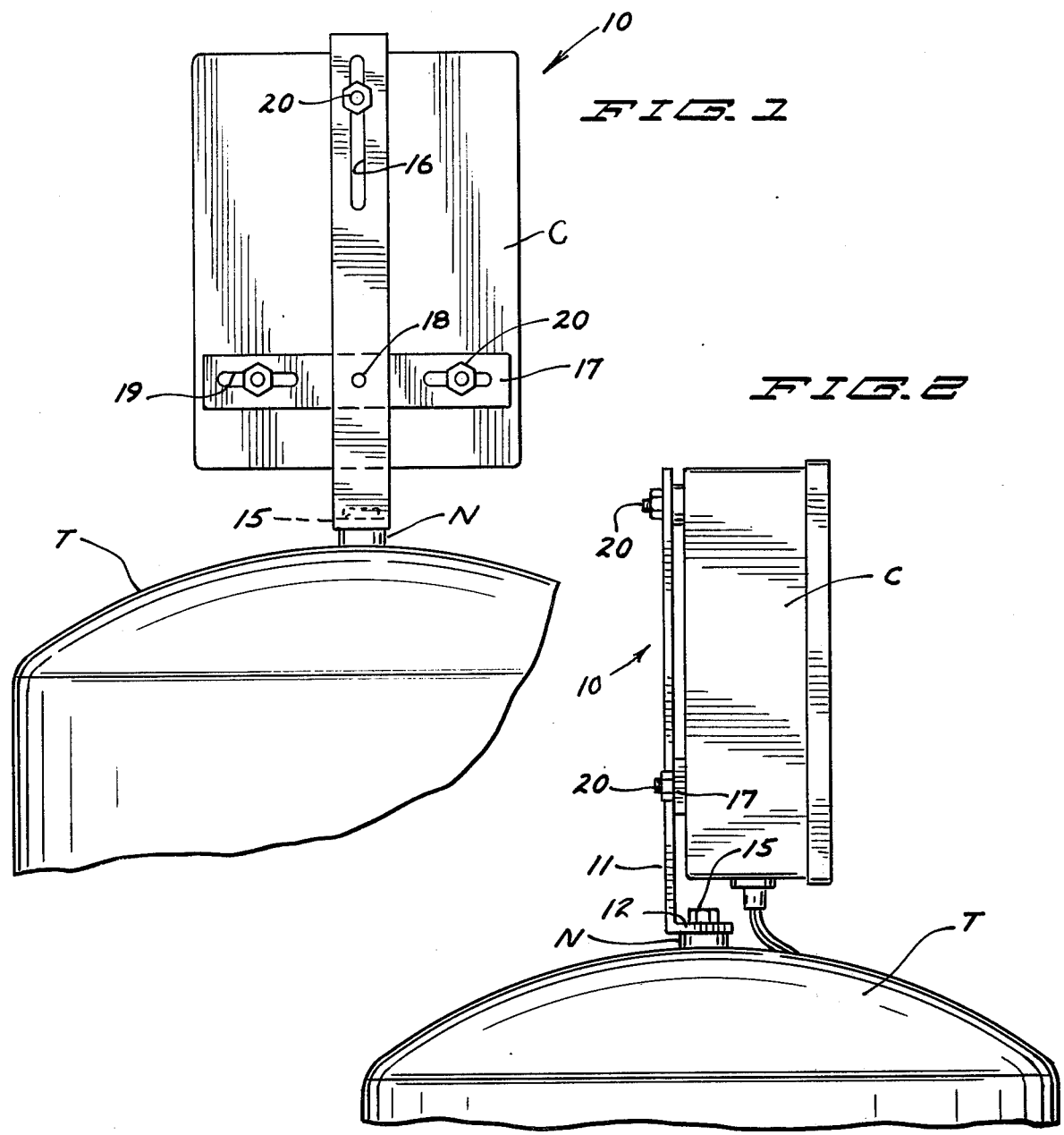
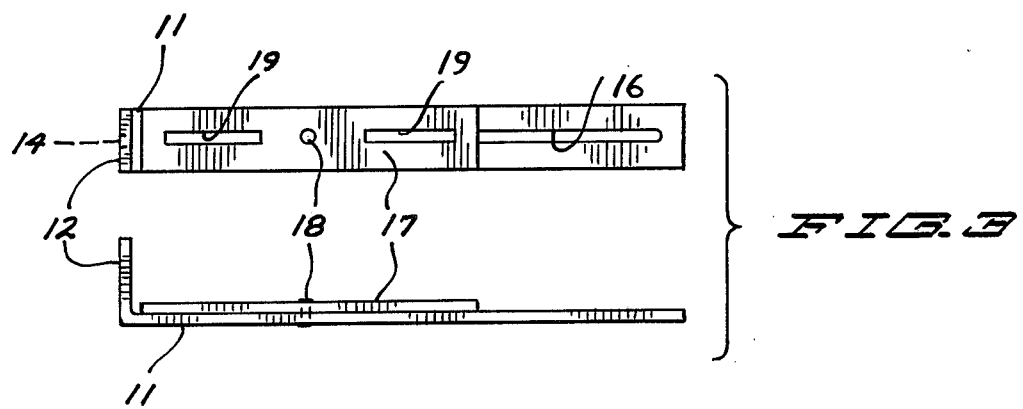

MOUNTING BRACKET FOR SUBMERSIBLE PUMP CONTROL BOX

The conventional three wire submersible water pump is provided with a control box which contains the starting capacitor, relay and other electrical components which control the pump operation. This box is normally mounted on a building wall adjacent to the pump pressure tank. Inasmuch as such walls are generally formed of concrete the mounting of the box can pose a considerable problem.

The object of the present invention is to provide a bracket for mounting the control box directly on the pump pressure tank.

Another object of the invention is to provide a pump control box mounting bracket which is collapsible for packaging in a minimal amount of space.

Still another object of the invention is to provide a bracket for mounting a submersible pump control box on the pump pressure tank and which bracket is adapted to mount such boxes of various heighths and widths.

With these and other other objects in view the invention broadly comprises a main support bar having and L bend at its lower end providing a mounting foot, said foot having an aperture therein for receiving a mounting bolt, a cross bar pivoted at its longitudinal middle to a medial point on the support bar for movement between a collapsed position alligned with the support bar and an erect position perpendicular to said bar, said cross bar having longitudinally extending slots on either side of the pivot and the support bar having a slot extending longitudinally thereof above the pivot, fastening means adapted to extend from the control box through each of said slots to integrally secure the box to the bracket.

BRIEF DESCRIPTION OF THE DRAWING

In the drawing:

FIG. 1 is a rear elevation of the bracket mounting a control box on the top of a pressure tank.

FIG. 2 is a side elevation of the bracket in erect control box mounting position as in FIG. 1.

FIG. 3 is a plan view of the bracket in collapsed position for packaging.

DESCRIPTION OF THE PREFERRED EMBODIMENT

Referring now more particularly to the drawings reference characters will be used to denote like parts or structural features in the different views. The upper end of a pressure tank used in connection with a submersible water pump is identified by the letter T. These tanks which have an upright cylindrical domed shape generally have a nut N mounted on the top thereof. This nut which is internally threaded is mounted on the tank T to provide a gripping means for holding the tank while it goes through a painting process and also while it is transported to its final operating position.

A control box C is used with a three wire submersible water pump. This box has a hinged front door and contains the electrical components for operating the pump. The back wall of box C is provided with a center top and two side apertures for mounting the box on a wall or other support fixture.

The bracket for mounting the box C on the tank T is denoted generally by the numeral 10. The bracket has a support bar 11 which has a foot 12 at its lower end bent at a right angle to the main portion of the bar. The foot 12 has an aperture 14 for receiving a bolt 15 which is threaded into the nut N to secure the bar 11 to the tank T in an upright or vertical position. The upper portion of bar 11 is provided with a longitudinally extending slot 16.

A cross bar 17 has its longitudinal center pivoted as by rivet 18 to a medial point on the support bar 11. Bar 17 has longitudinally extending slots 19 in each side of the pivot 18.

In packaging and shipment of the bracket 10 it is in the condition shown in FIG. 3 with the bars 17 and 11 in parallel allignment. This, of course, permits compact packaging. When the bracket is to be put into use, the cross bar 17 is pivoted to a perpendicular position with respect to the support bar 11 so that the bracket has a cross shape as shown in FIG. 1. Bolt 15 is then threaded into the nut N to mount the bracket on the pressure tank T.

The control box C is conventionally provided apertures in the back wall thereof for mounting purposes. Bolt and nut assemblies 20 are inserted through these apertures and the slots 16 and 19 to secure the box C to the bracket 5. The slots 16 and 19 allow the bracket to accommodate boxes of various sizes or where the mounting apertures in the back of the box are spaced at varying distances.

The invention accordingly provides a bracket for mounting a pump control box directly on the pressure tank which economically and effectively carries out the aforementioned objectives.

Having now therefore fully shown the described my invention, what I claim to be new and desire to protect by United States Letters Patent is:

1. A bracket for mounting the control box of a submersible water pump on the top of the pump pressure tank having an internally threaded nut positioned thereon on a vertical center axis,
   (a) an upright support bar,
   (b) means for integrally connecting the lower end of the support bar to the nut on the tank to hold the support bar in a vertical position,
   (c) a unitary planar cross bar mounted at a medial point on the support bar and extending perpendicular thereto with arms on either side of the support bar,
   (d) said support bar having an aperture above the cross bar,
   (e) the cross bar having apertures in each arm whereby a control box may be mounted on the bracket by fastening means extending between the box and through the apertures on the support bar and the cross bar,
   (f) the cross bar being pivotally mounted on the support bar for movement of the cross bar between a use position perpendicular to the support bar and a collapsed position in longitudinal parallel alignment therewith, and
   (g) all of said apertures being elongated slots extending longitudinally of the respective bars in which they are disposed.

* * * * *